(No Model.) 2 Sheets—Sheet 2.
C. W. WARNER.
PLANTER.
No. 531,606. Patented Dec. 25, 1894.
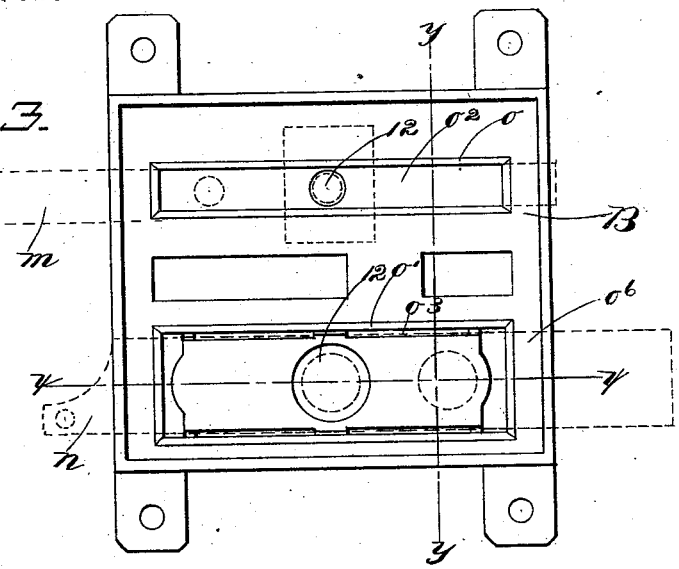
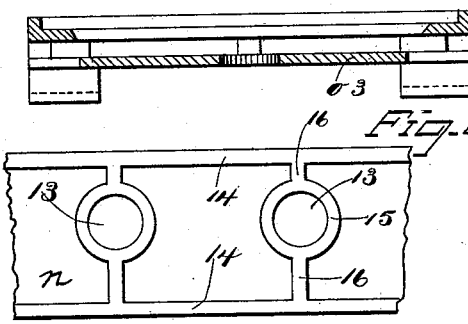
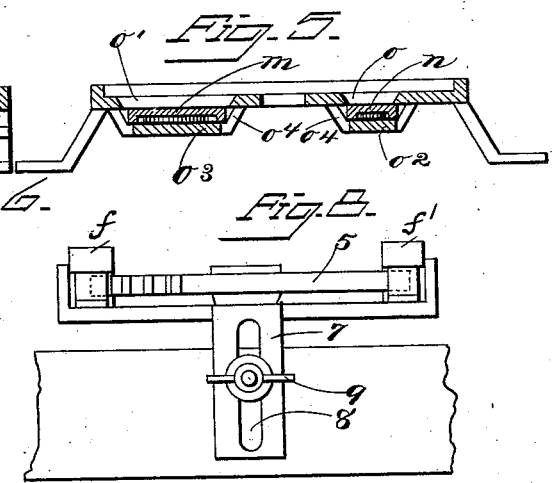
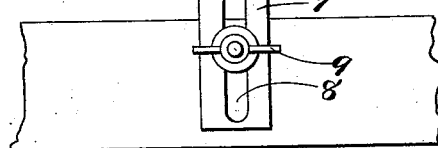
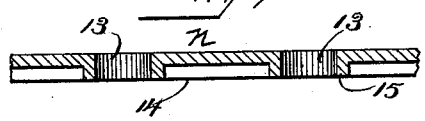
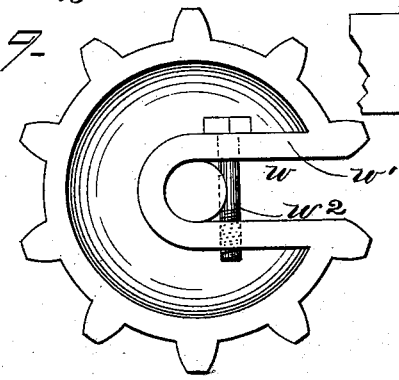
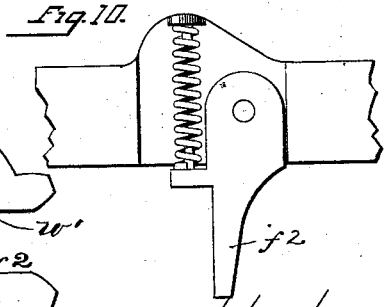
WITNESSES
F. C. Noyes.
C. B. Crocker
INVENTOR
Charles W. Warner
by P. J. Hayes atty.

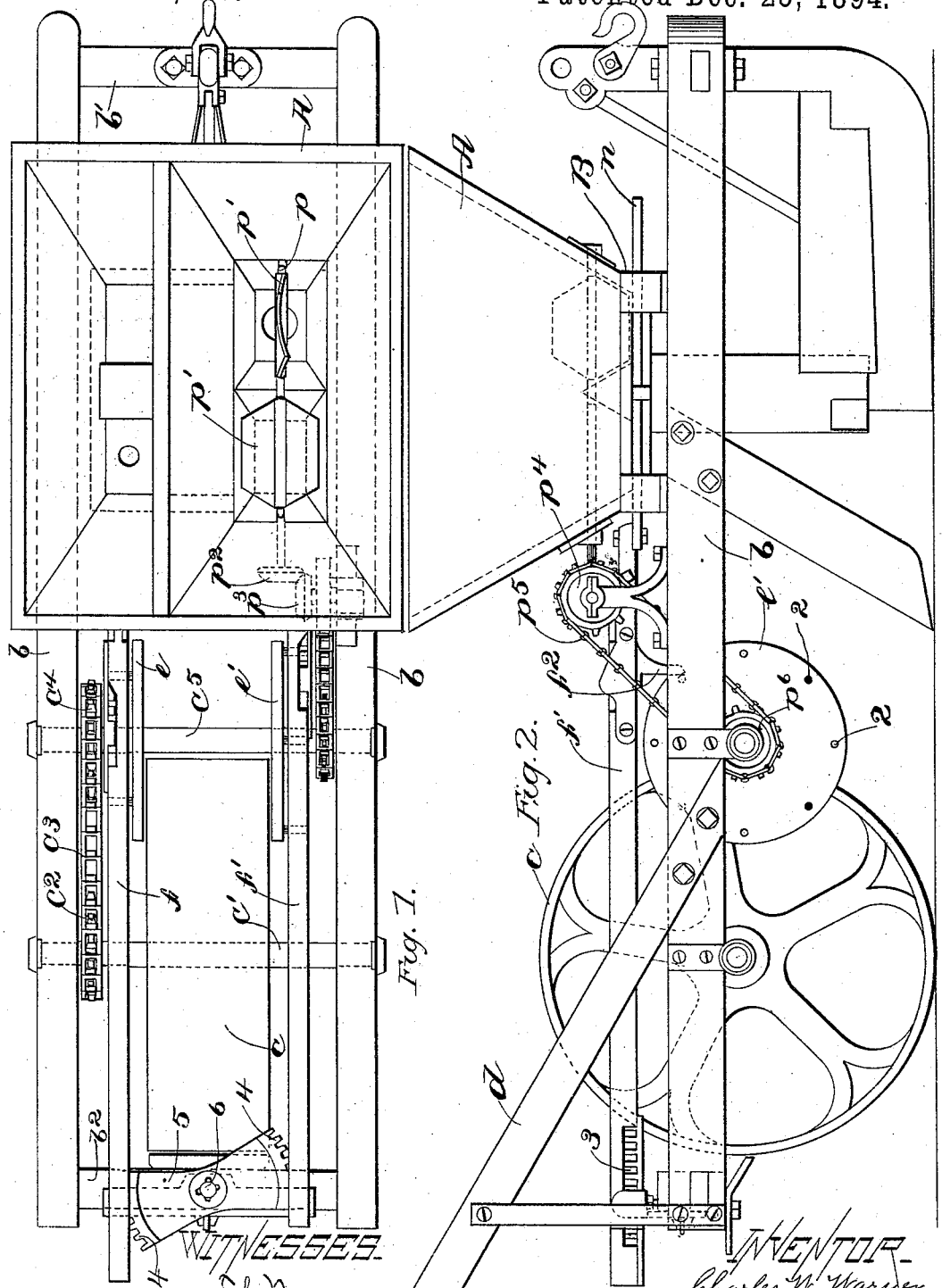

UNITED STATES PATENT OFFICE.

CHARLES W. WARNER, OF MELROSE, MASSACHUSETTS.

PLANTER.

SPECIFICATION forming part of Letters Patent No. 531,606, dated December 25, 1894.

Application filed November 18, 1893. Serial No. 491,306. (No model.)

*To all whom it may concern:*

Be it known that I, CHARLES W. WARNER, of Melrose, county of Middlesex, State of Massachusetts, have invented an Improvement in Planters, of which the following description, in connection with the accompanying drawings, is a specification, like letters and figures on the drawings representing like parts.

This invention relates to planters of that class wherein the fertilizer and seeds are placed in separate compartments, and delivered in such a manner that they will not come in contact with each other, such for instance as represented in United States Patent No. 330,798, dated November 17, 1885, to which reference may be had; and the invention has for its object to simplify and improve the apparatus shown and described in said patent in many ways, whereby the work may be more effectually done with less liability of derangement.

The invention consists in many details of construction which will be hereinafter pointed out.

Figure 1, shows in plan view a planter embodying this invention; Fig. 2, a side elevation of the same; Fig. 3, a plan view of the bottom plate or base of the hopper which contains the fertilizer and seeds, which is formed to present guideways for the delivery slides, which control the delivery of the materials; Fig. 4, a longitudinal section of the bottom plate shown in Fig. 3, taken on the dotted line $x-x$; Fig. 5, a cross section of the bottom plate shown in Fig. 3, taken on the dotted line $y-y$; Fig. 6, an under side view of a portion of one of the slides; Fig. 7, a longitudinal section of the slide shown in Fig. 6; and Fig. 8, a detail of a portion of the operating mechanism for the slides to be referred to; Fig. 9, a detail of one of the sprocket wheels to be referred to, showing a novel manner of securing it to its shaft; Fig. 10, a detail showing the spring pressed dog on the frame.

The hopper A, divided centrally by a vertical partition wall, is open at the bottom and is placed upon and bolted or otherwise secured to a metallic base B, which is in turn secured to the parallel side bars $b, b$, of the main framework. The side bars $b, b$, are connected together at the ends by cross pieces $b', b^2$, and between said side bars the ground wheel $c$ is placed on a shaft journaled in said side bars. Any usual or suitable handles $d$ are secured to the side bars which may be braced or supported in any desirable way.

To the shaft $c'$ of the ground wheel a sprocket wheel $c^2$, is secured over which passes a sprocket chain $c^3$, which passes around the sprocket wheel $c^4$, secured to a shaft $c^5$, having its bearings in the side bars $b, b$. Two disks $e, e'$, are secured to the shaft $c^5$, one at each side of the ground wheel, having a series of outwardly projecting pins 2, arranged at equal distances apart, but disposed alternately with relation to each other.

Two parallel bars $f, f'$, are arranged, one at each side of the ground wheel, connected at their forward ends to the delivery slides $m, n$, see dotted lines Fig. 3, and having at their rear ends racks 3, which are engaged by the sector teeth 4, on the plate 5, pivoted at 6, to a stand 7, having a slot 8, through which passes a thumb screw 9, by means of which said stand may be vertically adjusted. Depending from each bar $f, f'$, and normally projecting into the path of movement of the pins 2 on the disks are dogs $f^2$, pivotally supported and spring pressed, so as to permit said pins to pass by freely when the apparatus is drawn backward, but to be engaged by said pins when the apparatus is drawn forward. By means of these disks $e, e'$, it will be seen that the bars $f, f'$, are alternately advanced, and by means of the toothed plate 5, one of the bars will be drawn rearwardly as the other is advanced. Thus the delivery slides $m, n$, will be moved alternately.

When the stand 7, is adjusted to its uppermost position or thereabout, the bars $f f'$, will be raised high enough to permit the pins 2 to escape the dogs $f^2$, as the apparatus is drawn forward, which is of course necessary in order that the apparatus may be drawn forward without operating the delivery slides.

The base B, see Figs. 3, 4, and 5, consists of a quadrangular shaped casting having two elongated rectangular openings $o, o'$, in the top plate arranged directly beneath the two compartments of the hopper A, and rectangular bottom plates $o^2, o^3$, supported directly beneath said openings $o, o'$, by hangers or brackets $o^4$, said bottom plates and their supporting hangers being preferably cast integral with the top plate. Guideways for the delivery slides $m$, $n$, are thereby formed beneath the openings $o$, $o'$, having end openings which permit free longitudinal movement of said slides, and also having openings or clearance passages at the sides, for the escape of any material which may work over the sides of said slides, and which would have a tendency to clog or check its movement were not said side openings provided. Each bottom plate $o^2$, $o^3$, has a central hole 12, through it.

It is designed that the seeds, as corn for instance, shall be delivered from the seed compartment by the slide $m$, and the fertilizer from its compartment by the slide $n$, and these slides are or may be quite similar in shape and construction, being formed of rectangular pieces of metal, each having two holes 13, through it. As the slides are moved back and forth in their guideways by means of the bars $f$, $f'$, across the central delivery orifices 12, in the bottom plates, the seeds and fertilizer are alternately delivered as in the patent referred to.

The delivery slide $n$, is made as a skeleton frame, being flat upon the upper surface, as shown in Fig. 7, and cut away or recessed upon its under surface, as shown in Fig. 6, thereby forming marginal ribs 14, circular ribs 15, around the delivery orifices, and short ribs 16, between said ribs 14 and 15.

Much difficulty is experienced with the fertilizer clogging and thereby preventing the effectual operation of the machine, as well as its own escape from the hopper, and it is to obviate this difficulty that the side openings are provided in the guideway as described, and the ribs 14, 15, and 16, formed upon the under surface of the slide $n$, serve to scrape or clean the bottom plate upon which said slide rests, and the material so removed is pushed off the ends of said bottom plate, or drops through the central delivery opening, as the slide moves back and forth. That the ribs of the slides may operate in this manner, the ends of the bottom plate are formed to correspond with the shape of said ribs, as shown at $o^6$, and when the slide is pushed in one or the other direction, the ribs 15, and 16, stop flush with the ends of said plate. It will be seen that so far as enabling the slide $n$, to thus scrape off or clean the bottom plate, the ribs may be otherwise arranged, so I do not desire to limit my invention to any particular arrangement of ribs, so long as they serve as scrapers, and co-operate with the bottom plate as described. The seed delivering slide $m$, may be constructed in this same manner if desired, but the object of such construction is essential mainly for lightness, as the seeds do not obstruct the passage of the slide $m$, as the fertilizer does the slide $n$.

Contained within the fertilizer compartment of the hopper A, is an agitator, see Figs. 1 and 2, made as a shaft $p$ having its bearings in the side walls of the hopper, and provided with two sets of blades $p'$, preferably curved and arranged at right angles with relation to each other, and upon said shaft a bevel gear $p^2$ is secured which is engaged by a bevel gear $p^3$, secured to a short shaft to which is secured the sprocket wheel $p^4$, over which passes a sprocket chain $p^5$, which also passes around the sprocket wheel $p^6$ secured to the shaft $c^5$. By means of this gearing between the shaft $c^5$, and the agitator, the latter is rotated.

The forward end of the apparatus will be provided with any usual or suitable draft hook or equivalent.

To adjust the delivery in such a manner that the seeds and fertilizer shall be delivered at any number of desirable distances apart, sprocket wheels $c^2$, $c^4$, of different diameters may be employed, and to facilitate their removal from their shafts, without removing the shafts from their bearings, they are made as shown in Fig. 9, wherein it will be observed that they are recessed radially as at $w$, to receive the shaft, and along the margin of said recess, a flange $w'$, is provided through which a bolt or pin $w^2$, passes as shown, the shank of said bolt or pin in its passage entering a groove made to receive it in the side of the shaft. This bolt thereby serves to secure the wheel to the shaft that it may rotate therewith, and not move longitudinally thereon.

I claim—

1. In a planter, the combination of two compartments, delivery slides $m$, $n$, for said compartments, bars $f$, $f'$, connected to said slides, disks having pins for advancing them alternately, shaft for said disks, ground wheel, and shaft therefor, and connections between said shafts, racks 3, at the rear ends of said bars $f$, $f'$, toothed plate 5, engaging therewith, and the vertically adjustable stand 7, to which said toothed plate is pivoted.

2. In a planter, the combination of two compartments, delivery slides $m$, $n$, bars $f$, $f'$, connected thereto, having depending dogs $f^2$, disks $e$, $e'$, having pins 2, shaft $c^5$, to which said disks are secured, ground wheel $c$, its shaft $c'$, and intermediate connections between said shafts $c^5$, and $c'$, whereby the former is driven by the latter.

3. In a planter, the combination of two compartments, delivery slides $m$, $n$, bars $f$, $f'$, connected thereto, having depending dogs $f^2$, disks $e$, $e'$, having pins 2, shaft $c^5$, to which said disks are secured, sprocket wheel $c^4$, chain $c^3$, sprocket wheel $c^2$, shaft $c'$ and the ground wheel $c$.

4. In a planter, the combination with a fertilizer compartment having two delivery orifices, and a reciprocating delivering device, of an agitator contained in said compartment, consisting of the rotary shaft $p$, two pairs of radial blades $p'$, $p'$, arranged thereon at right angles with relation to each other as shown, there being one pair above each delivering orifice, and by their construction and arrangement acting to crowd the material down into the orifices, alternately, and gearing connecting said shaft $p$ with a driving shaft whereby the former is rotated by the latter, substantially as described.

5. In a planter, the combination of two compartments, a base B therefor, consisting of an integrally formed casting comprising a top plate provided with elongated openings $o$, $o'$ beneath the compartments, bottom plates $o^2$, $o^3$, made substantially as long as said openings, and having central delivery openings and side supports for holding them a short distance beneath, but in a parallel plane with said openings, said side supports being arranged a certain distance apart to present side and end openings, and delivery slides $m$, $n$ upon said bottom plates $o^2$, $o^3$, and means for moving them longitudinally thereon, substantially as described.

6. In a planter, the combination of a compartment, a base B therefor, consisting of an integrally formed casting comprising a top plate having an elongated opening $o$ directly beneath the compartment, bottom plate $o^3$, beneath said opening, made substantially as long as said opening and having a central delivery opening side supports for holding said bottom plate in a plane below but substantially parallel with said opening, said supports being arranged at suitable distances apart to present side and end openings, a delivery slide $m$, upon said bottom plate $o^3$, and means for moving said slide longitudinally, substantially as described.

7. In a planter, the combination of a compartment, a base therefor having an elongated delivery opening, bottom plate $o^3$ beneath said opening, made substantially as long as said opening, and having a central delivery opening, side supports for holding said bottom plate in a plane below but substantially parallel with said opening, said supports being arranged at suitable distances apart to present side and end openings, and a delivery slide $m$ moving upon said bottom plate $o^3$ having two openings 13, and provided upon its under side with marginal ribs 14, circular ribs 15, and transverse connecting ribs 16, and means for reciprocating said slide longitudinally to alternately bring the ribs 15, 16, flush with the opposite ends of the bottom plate $o^3$, substantially as described.

8. In a planter, a ground wheel, its shaft, an operating shaft arranged in parallelism therewith and adapted to control the delivering device, a sprocket wheel on each shaft, one of which has a radial shaft receiving opening, means for securing said sprocket wheel to its shaft, and a sprocket chain passing around said sprocket wheels.

In testimony whereof I have signed my name to this specification in the presence of two subscribing witnesses.

CHARLES W. WARNER.

Witnesses:
B. J. NOYES,
C. B. CROCKER.